(12) United States Patent
Couvillon et al.

(10) Patent No.: US 10,622,823 B2
(45) Date of Patent: Apr. 14, 2020

(54) BATTERY CHARGING AND DISCHARGING WITHOUT INTERFACE REMOVAL

(71) Applicant: The Government of the United States, as represented by the Secretary of the Army, Washington, DC (US)

(72) Inventors: Ivan Couvillon, Lutherville, MD (US); Matthew Limpert, Bel Air, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 214 days.

(21) Appl. No.: 15/470,955

(22) Filed: Mar. 28, 2017

(65) Prior Publication Data
US 2018/0287406 A1   Oct. 4, 2018

(51) Int. Cl.
*H02J 7/00*   (2006.01)
*H02J 7/14*   (2006.01)

(52) U.S. Cl.
CPC .......... *H02J 7/0068* (2013.01); *H02J 7/0069* (2020.01); *H02J 2207/40* (2020.01)

(58) Field of Classification Search
USPC ....... 320/132, 134, 135, 136, 137, 138, 139; 32/132, 134, 135, 136, 137, 138, 139
See application file for complete search history.

(56) References Cited

U.S. PATENT DOCUMENTS

| | | | | |
|---|---|---|---|---|
| 2014/0340044 A1* | 11/2014 | Kim | ...................... | H02J 7/0016 320/134 |
| 2015/0295431 A1* | 10/2015 | Honda | .................. | H02J 7/0021 320/136 |
| 2016/0013675 A1* | 1/2016 | Workman | ............. | H02J 7/0045 320/101 |
| 2016/0099588 A1* | 4/2016 | Bae | ....................... | H02J 7/0024 320/107 |
| 2016/0204627 A1* | 7/2016 | Wang | .................... | H02J 7/0016 320/118 |
| 2016/0204648 A1* | 7/2016 | Kawamura | ............. | B60L 50/52 320/107 |
| 2017/0025867 A1* | 1/2017 | Wang | .................... | H02J 7/0019 |
| 2017/0244261 A1* | 8/2017 | Chen | .................... | H02J 7/0047 |
| 2018/0159348 A1* | 6/2018 | Chang | .................. | H02J 7/0068 |

* cited by examiner

*Primary Examiner* — Alexis B Pacheco
(74) *Attorney, Agent, or Firm* — Ronald Krosky; Azza Jayaprakash

(57) ABSTRACT

Various embodiments are described that relate to a battery. A battery, such as a battery with a common input/output terminal, can be tested. Part of this testing can include charging the battery and discharging the battery. It can be dangerous to switch out an interface between charging and discharging. Therefore, a single interface can be employed that enables the battery to be charged and discarded. With this, the battery can be charged and discharged without the danger of switching the interface.

20 Claims, 21 Drawing Sheets

US 10,622,823 B2

1

BATTERY CHARGING AND DISCHARGING WITHOUT INTERFACE REMOVAL

GOVERNMENT INTEREST

The innovation described herein may be manufactured, used, imported, sold, and licensed by or for the Government of the United States of America without the payment of any royalty thereon or therefor.

BACKGROUND

Different batteries can be used in a wide variety of devices used in a variety of applications. The more important the device and/or the more critical the application, then the greater damage if the battery fails. In view of this, at times it can be important to test a battery.

SUMMARY

In one embodiment, a system comprises an exchange component and a conduit component. The exchange component can be at least partially hardware and be configured to physically interface with a common input/output terminal of a battery. The conduit component can be configured to receive a charge and a discharge for the battery while the exchange component is interfaced with the battery such that the interface between the exchange component and the battery is configured to not be removed between a charge and a discharge. The exchange component and the conduit component can be coupled together and the conduit component can be configured to not be decoupled from the exchange component between a charge and a discharge.

In another embodiment, a system comprises an interface component, a charge component, and a discharge component. The interface component can be at least partially hardware and be configured to interface with a battery with a single input/output terminal. The charge component can be configured to charge the battery while the interface component is interfaced with the battery and the discharge component can be configured to discharge the battery while the interface component is interfaced with the battery. The charge component and then subsequently the discharge component can be configured to operate while the interface component interfaces with the battery. Also, the discharge component and then subsequently the charge component can be configured to operate while the interface component interfaces with the battery.

In yet another embodiment, a method can comprise causing a charging, by way of charging hardware, of a unit under test along a hardware connection. The method can also comprise causing a discharging, by way of discharging hardware, of the unit under test along the hardware connection. The hardware connection can remain connected to the unit under test between the charging and the discharging. The unit under test can have a common input/output terminal.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

2

Figure 1A:
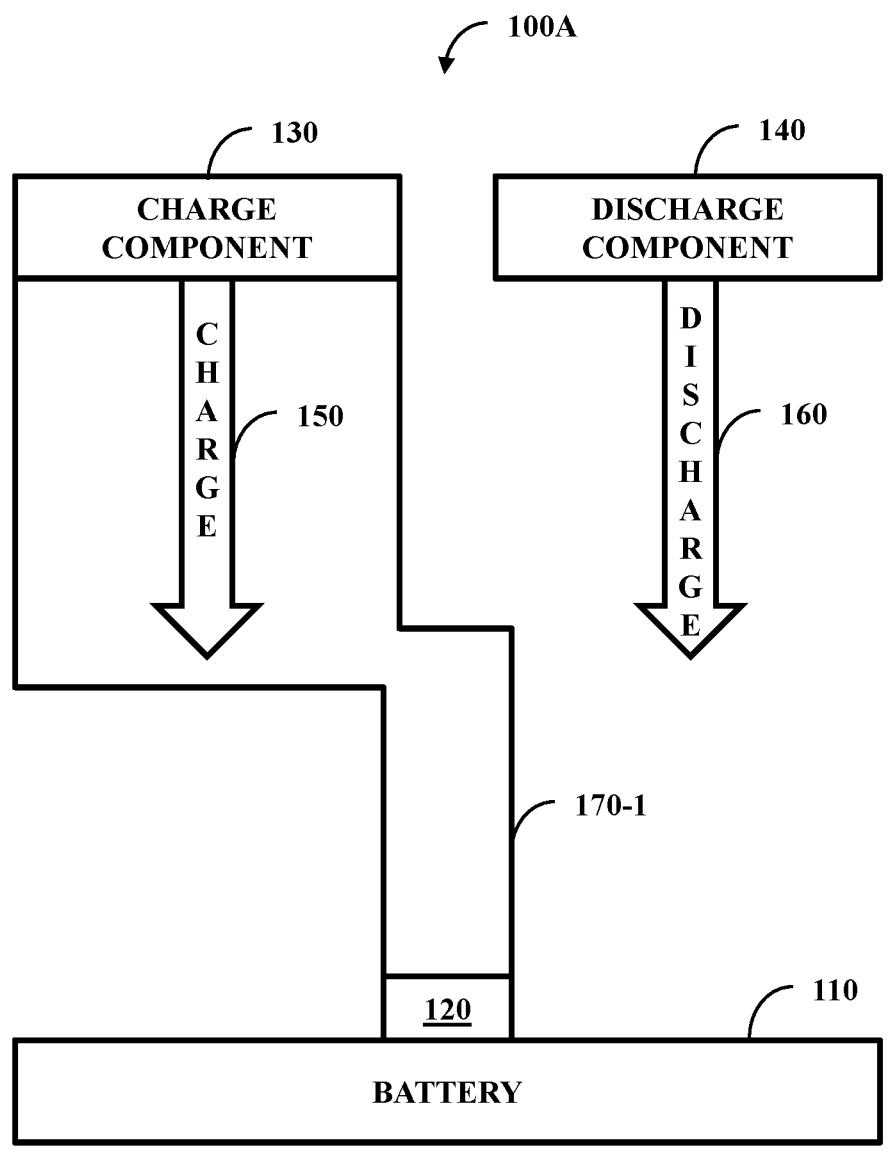
FIG. 1A illustrates one embodiment of a charge component connected environment.
Figure 1B:
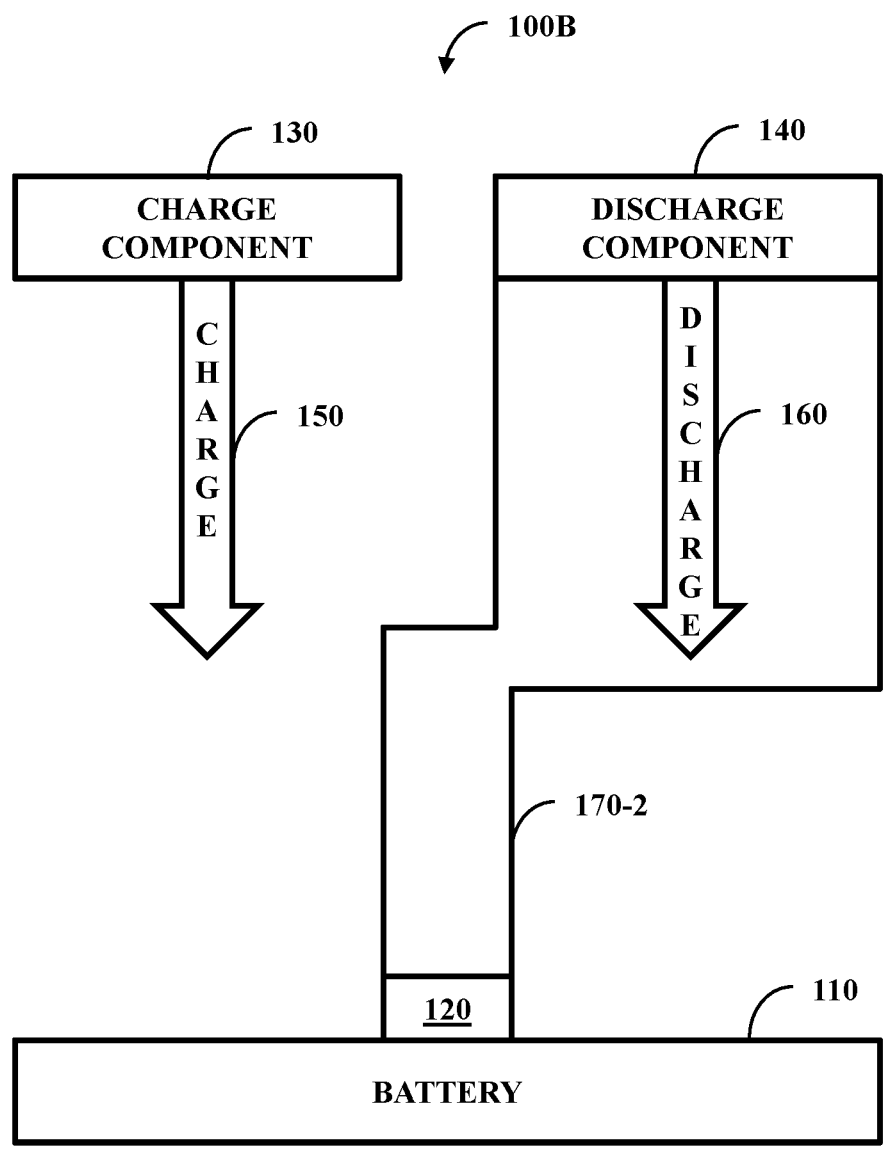
Figure 2:
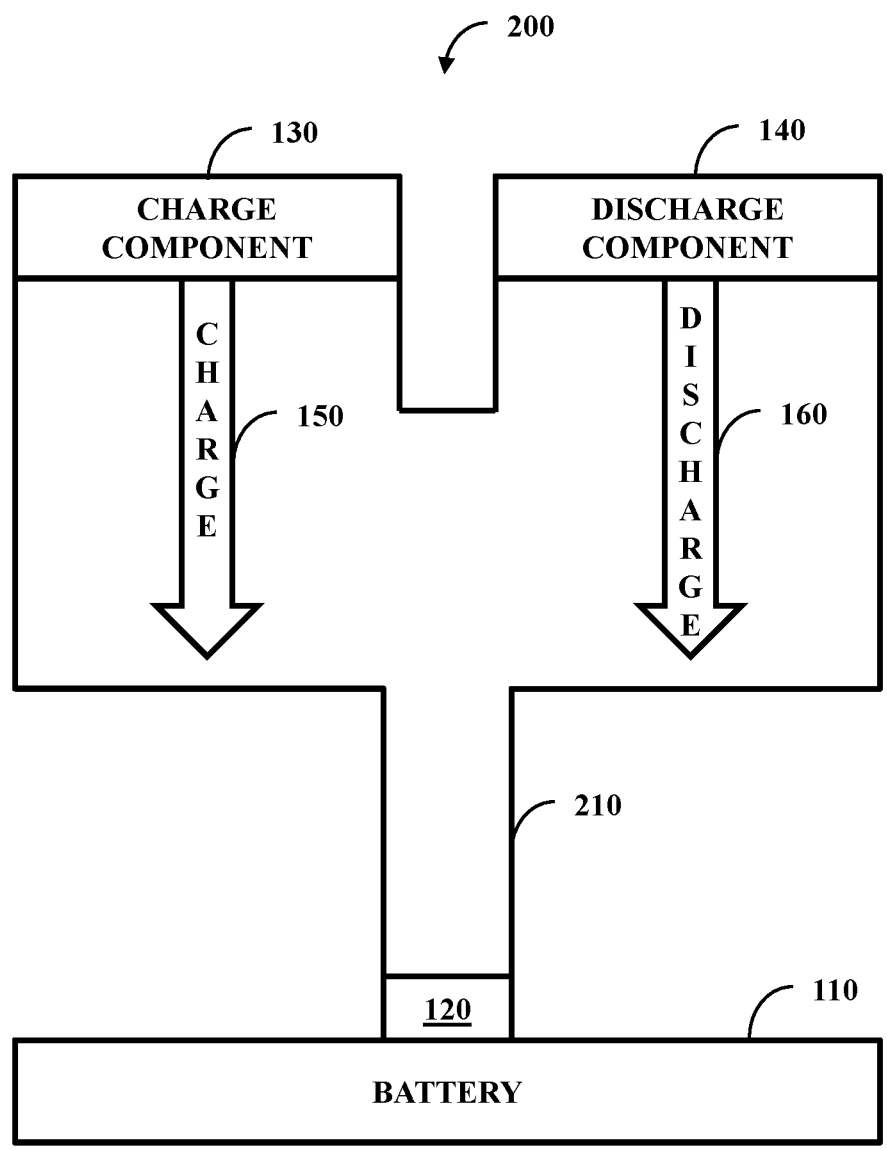
Figure 3:
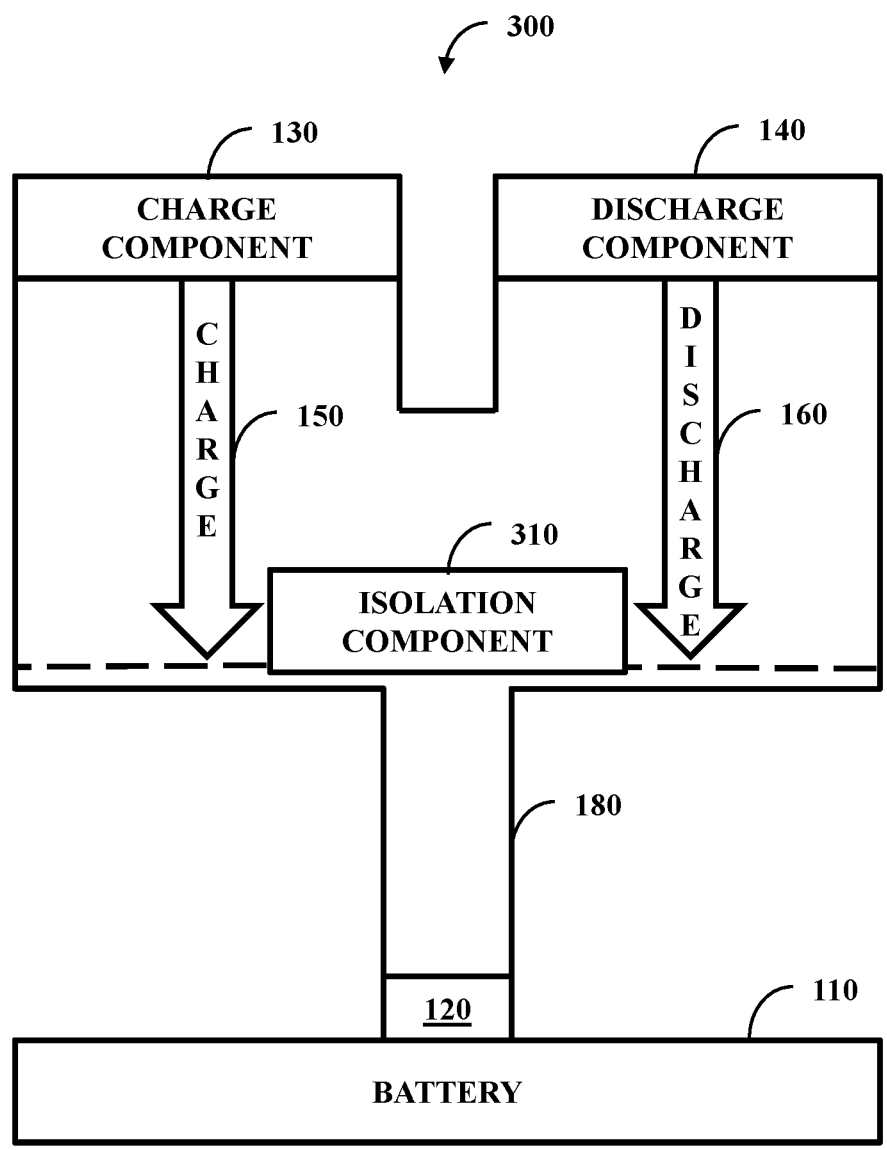
Figure 4:
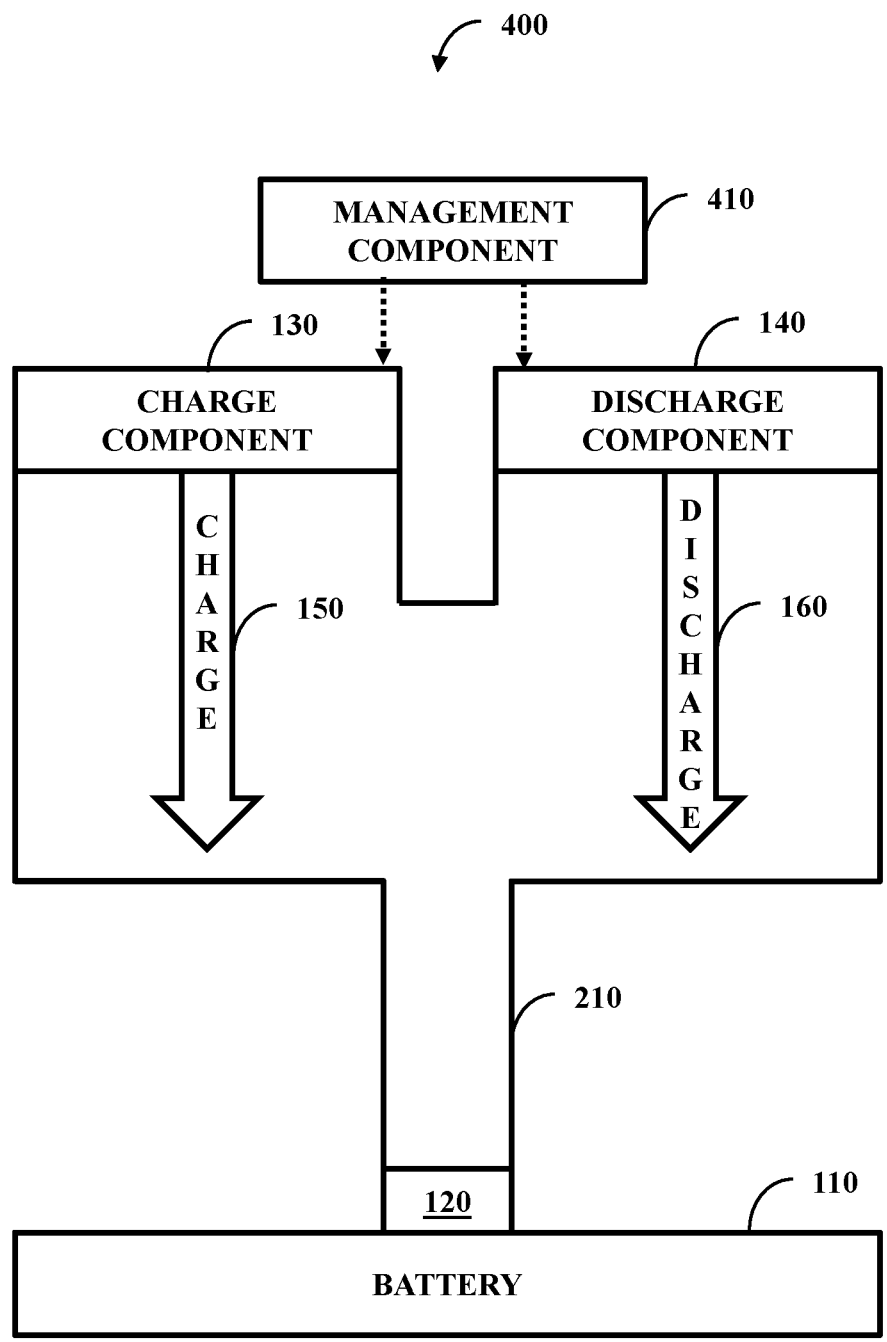
Figure 5:
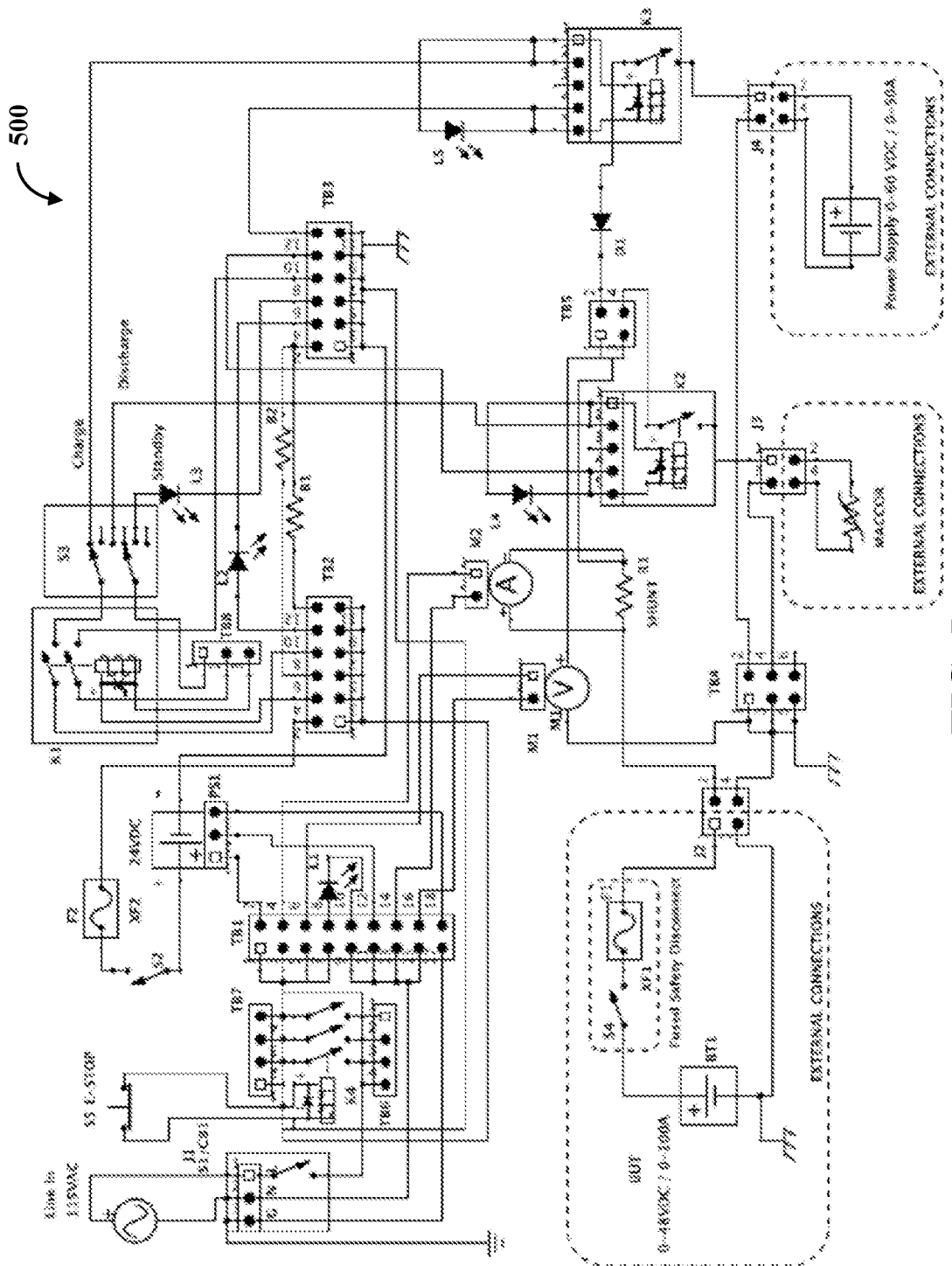
Figure 7:
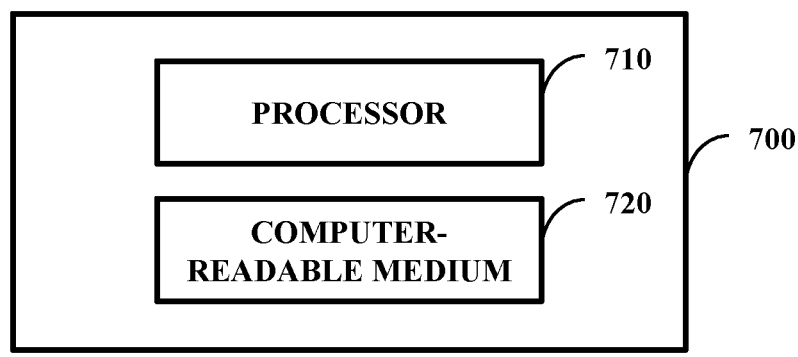
Figure 8:
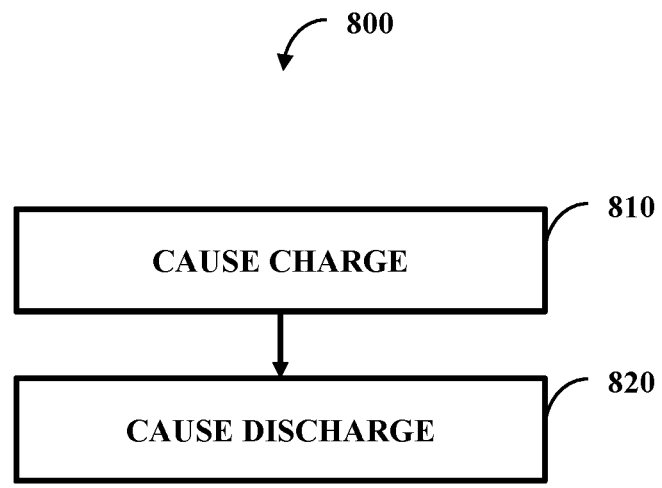
Figure 9:
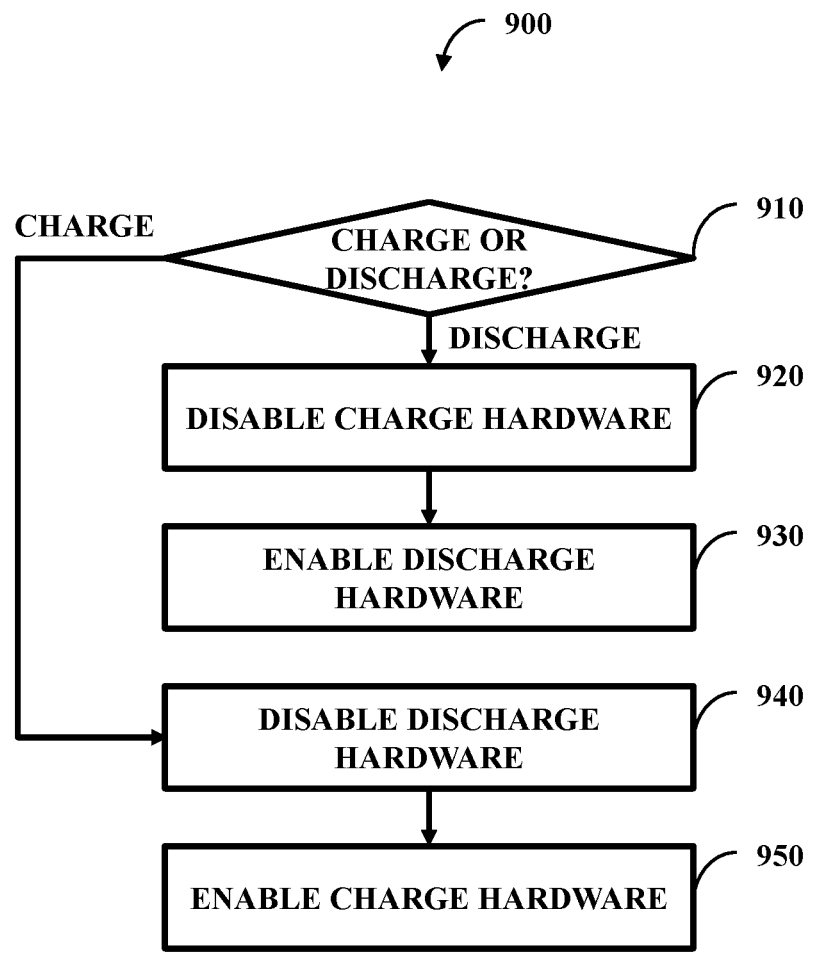

FIG. 1B illustrates one embodiment of a discharge component connected environment;

FIG. 2 illustrates one embodiment of a charge component and discharge component simultaneously connected environment;

FIG. 3 illustrates one embodiment of a charge component and discharge component simultaneously connected environment with an isolation component;

FIG. 4 illustrates one embodiment of a charge component and discharge component simultaneously connected environment with a management component;

FIG. 5 illustrates one embodiment of a schematic that can be used to facilitate practicing at least one aspect disclosed herein;

FIGS. 6A-6K illustrate one embodiment of various views of the apparatus that can be used to facilitate practicing at least one aspect disclosed herein;

FIG. 7 illustrates one embodiment of a system comprising a processor and computer-readable medium;

FIG. 8 illustrates one embodiment of a method comprising two actions;

FIG. 9 illustrates one embodiment of a method comprising five actions; and

Figure 10:
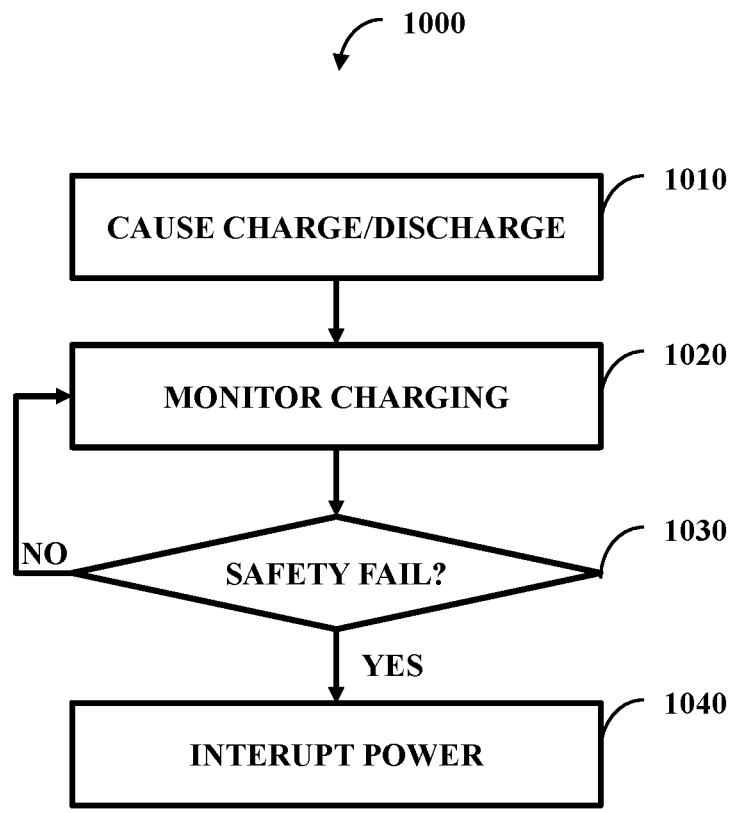

FIG. 10 illustrates one embodiment of a method comprising four actions.

Reference to these drawings elsewhere in the text can be summarized for ease in readability. In one example, when discussing FIG. 1 such as when referring back to something illustrated in FIG. 1A, FIG. 1A can be addressed as "FIG. 1." Similarly, when an aspect is addressed in multiple drawings with a common base number, such as a common aspect in FIGS. 1A and 1B, these can simply be addressed as "FIG. 1."

DETAILED DESCRIPTION

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action (s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1A illustrates one embodiment of a charge component connected environment 100A and FIG. 1B illustrates one embodiment of a discharge component connected environment 100B. In one configuration, a battery 110 can include a single input/output terminal 120. The battery 110, by way of the terminal 120, can be potentially connected to a charge component 130 (e.g., charger) or a discharge component 140 (e.g., load). When connected to the charge component 130, the battery 110 can receive a charge 150 and similarly, when connected to the discharge component 140, the battery 110 can receive a discharge 160.

The environment 100 can be used to test the battery 110. In an example operation of this configuration, an interface 170 can be coupled to the charge component 130 and not coupled to the discharge component 140; the interface in this arrangement is designated as 170-1. Once charged, the interface 170 can be decoupled from the charge component 130 and interfaced to the discharge component 140; the interface in this arrangement is designated as 170-2. Decouplement of the interface 170 can be performed by a technician.

This configuration has multiple drawbacks. A main drawback is safety of the technician and other personnel. In one example, once charged, the battery 110 can be considered live. Inductance from the battery can cause creation of a flash/arc between positive and negative contacts of an input/output cable of the battery 110. Therefore, it can be beneficial to have the battery 110 simultaneously coupled to the charge component 130 and the discharge component 140 so that the charge 150 and discharge 160 can be delivered without physically moving the interface 170.

An additional drawback is that coupling and decoupling the interface 170 can cause physical wear and tear on the interface 170. The more wear and tear on the interface 170, the sooner the interface 170 should be replaced. More frequent replacement of the interface 170 can lead to undesirable higher costs.

FIG. 2 illustrates one embodiment of the charge component and the discharge component simultaneously connected environment 200. An interface component 210 can be configured to interface with the battery 110 (e.g., by way of interfacing the terminal 120), the charge component 130, and the discharge component 140. The charge component 130 can be configured to charge 150 the battery 110 while the interface component 210 is interfaced with the battery 110. Similarly, the discharge component 140 can be configured to discharge 160 the battery 110 while the interface component 210 is interfaced with the battery 110.

The charge component 130 and then subsequently the discharge component 140 (or vice versa) are configured to operate while the interface component 210 interfaces with the battery. In one example, a test can be run where the charge component 130 charges the battery 110 and then the discharge component 140 discharges the charger from the battery 110 without the interface component 210 being removed and as such the flash/arc is not produced. In another example, a first test can occur where the charge component 130 can charge 150 the battery 110 at a first charge level and then the discharge component 140 can discharge 160 at a first discharge level (e.g., about equal to a negative of the first charge level such that the battery 110 returns to a neutral state). After this, a second test can occur where the charge component 130 can charge 150 the battery 110 at a second charge level (e.g., different from the first charge level) and then the discharge component 140 can discharge 160 at a second discharge level. These two tests can be run on the battery 110 one after the other, such that that the interface component 210 is not removed between tests; in this, the charge component 130 in the second test functions after the discharge component 140 functions in the first test.

In one embodiment, the battery 110 can be a large format battery (a battery greater than about one kilowatt-hour). The battery 110 can be of different chemistries, such as lithium ion (e.g., lithium iron phosphate or lithium cobalt dioxide), nickel metal hydride, or molten salt. The battery 110 can be of different voltages, such as of at least about 20 Volts direct current (VDC).

FIG. 3 illustrates one embodiment of a charge component and discharge component simultaneously connected environment 300 with an isolation component 310. The isolation component 310 can be configured to isolate the charge component 130 from the discharge component 140. In one embodiment, the isolation component 310 is a Schottky diode (e.g., Schottky style transient voltage suppressing (TVS) diode).

FIG. 4 illustrates one embodiment of a charge component and discharge component simultaneously connected environment 400 with a management component 410. The management component 410 can be configured to manage between the charge component 130 and the discharge component 140 such that the battery is not charged and discharged concurrently. In one embodiment, the management component 410 is implemented, at least in part, by way of a switch. The switch can comprise a discharge setting that causes the discharge component 140 to discharge 160 the battery 110. The switch can also comprise a charge setting that causes the charge component 130 to charge 150 the battery 110. The switch can further comprise a neutral setting that does not cause charge 150 or discharge 160.

FIG. 5 illustrates one embodiment of a schematic 500 of an apparatus that can be used to facilitate practicing at least one aspect disclosed herein. The system can facilitate a unit under test (UUT), such as the battery 110 of FIG. 2, which can be connected to an electrical connector J2. The UUT can be subjected to charging or discharging from external entities (e.g., the charge component 130 of FIG. 2 or the discharge component 140 of FIG. 2). The UUT can be charged using the charge component 130 of FIG. 2 (e.g., a power supply) connected to the electrical connector J4. The UUT can be discharged (e.g., placed under an electrical load) by using the discharge component 140 of FIG. 2 (e.g., a battery test system) connected to an electrical connector J3. The charging device and discharging device can be electrically isolated by using the isolation component 310 of FIG. 3 (e.g., a Schottky style TVS diode D1).

The system can operate using 120 volt alternating current (VAC) power that can be connected through connector J1. AC voltage can be converted to 24 VDC using an internal power supply PS1. The system can also use electromechanical devices including relays K1-K4, meters M1-M2, light emitting diodes (LEDs) L1-L5, and cooling fans B1-B2 that operate on 24 VDC voltage.

Operation of the system can be controlled by using the selector switch S3 that can be a 2-pole, single throw, 2-deck rotary switch. The switch can be wired such that the operation of the system can be changed from a "standby" status to either a "charge" status or "discharge" status. In this, the selector switch can function as the management component 410 of FIG. 4. When the switch is in "standby" status there can be, in one embodiment, no load on the system. When the switch is in the "charge" or "discharge" status, a contactor style relay, such as relay K3 for "charge" or relay K2 for "discharge", is energized closing the appropriate relay's contacts and allowing current to flow through part of the system. An LED indicator can be illuminated to show which state the selector switch is set to, such as state L3 for "standby", state L4 for "discharge", and state L5 for "charge." A digital panel-mounted meter set can be used to provide metering during operation to allow a user to observe the voltage M1 and current M2 for the UUT.

The system can include several features to ensure safety of personnel and equipment. The AC input connector J1 can comprise an integrated 16 Amps (A) circuit breaker CB1 to prevent overloading AC circuitry. In one embodiment, the maximum current on the 120 VAC circuit can be about 12 A. The system can comprise an emergency stop switch S5 that can work in tandem with the safety/monitor relay K4. Relay K4 can interrupt power to the 120 VAC circuit resulting in the 24 VDC power supply PS1 shutting down. The relay K4 can use a feed-back loop between a safety switch as a monitoring device providing additional redundancy in the safety circuit. A 2-A panel-mounted fuse F2 can be employed to protect the 24 VDC control circuit. The total load on the 24 VDC circuit can be around 0.75 A.

A main on-off switch S2 can be a key-lock switch. By allowing an operator to remove the key, the system can be prevented from becoming energized, inadvertently. The relay K1 can be included in the system to prevent the operator from being able to activate the 24 VDC circuit using the key-lock switch S2 unless the 3-position switch S3 is in the "standby" position.

In one embodiment, an exchange component (e.g., at least part of the connector J2) can be configured to interface with the UUT. In one example, the exchange component interfaces with the terminal 120 of FIG. 1 when the battery 110 of FIG. 1 is a large format battery. A conduit component (e.g., the ports 2 and 4 of the connector J2, wires leading into the connector J2, the relays K2 and K3, or at least part of the connectors J3 and J4) can be configured to receive a charge and a discharge for the UUT while the exchange component is interfaced with the UUT such that the interface between the exchange component and the battery is configured to not be removed between a charge and a discharge. The conduit component and the exchange component can be coupled together, such as by being one physical unit or being segregable physical units.

In one embodiment, the conduit component is configured to be coupled to a charge device (e.g., the power supply) configured to supply the charge and is configured to be coupled to, at the same time as the charge component, a discharge device (e.g., MACCOR) configured to supply the discharge. The conduit component can be configured to not be decoupled from the interface component between a charge and a discharge (as well as a subsequent second charge or discharge).

An administration component (e.g., the selector switch S3) can be configured to manage between the charge from the charge device and the discharge from the discharge device. In one example, the administration component can manage a charge relay (e.g., relay K3) and a discharge relay (e.g., relay K2), such as opening and closing of the relays. The charge relay can be closed and the discharge relay can be opened in response to a designation to charge the battery. Conversely, the discharge relay can be closed and the charge relay can be opened in response to a designation to discharge the battery.

Figure 6A:
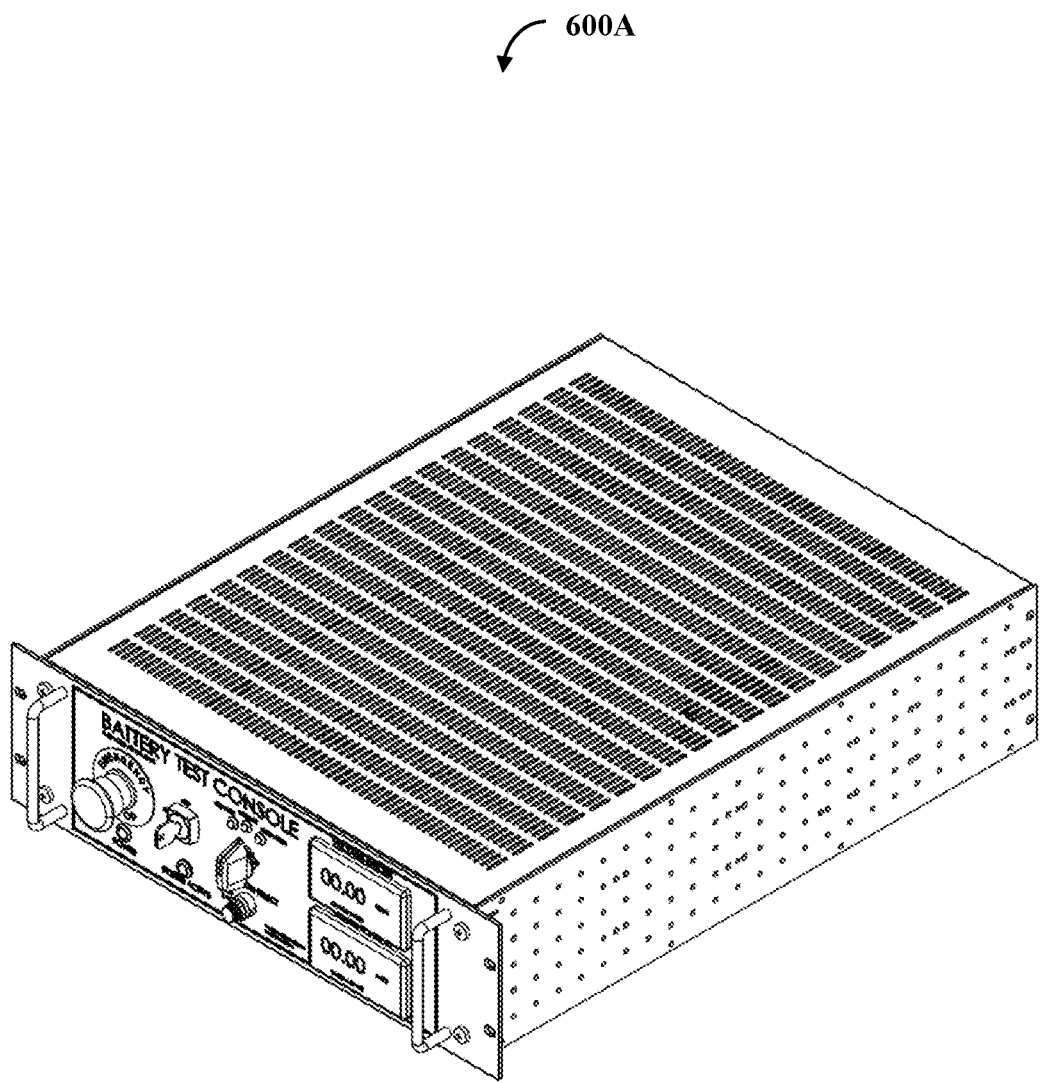
Figure 6B:
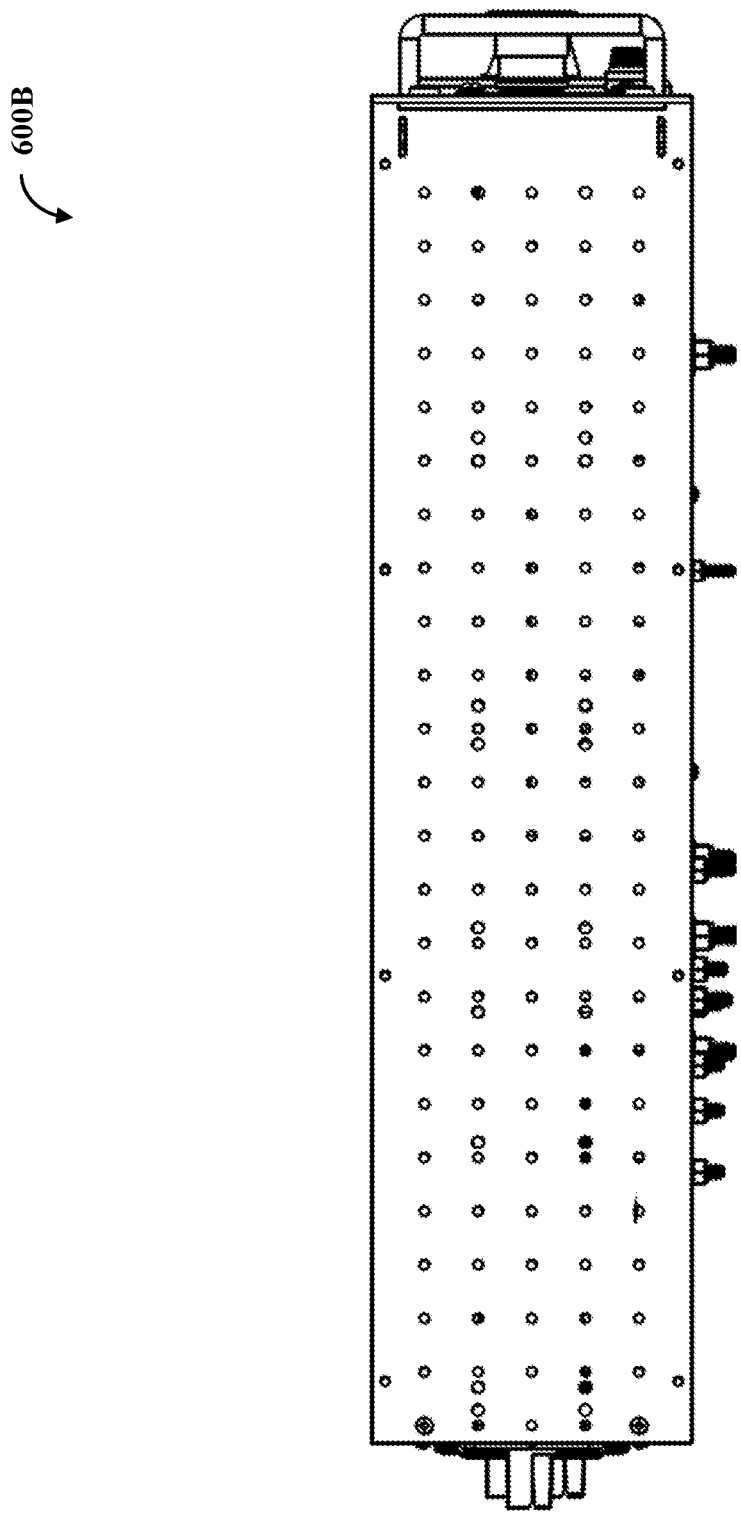
Figure 6C:
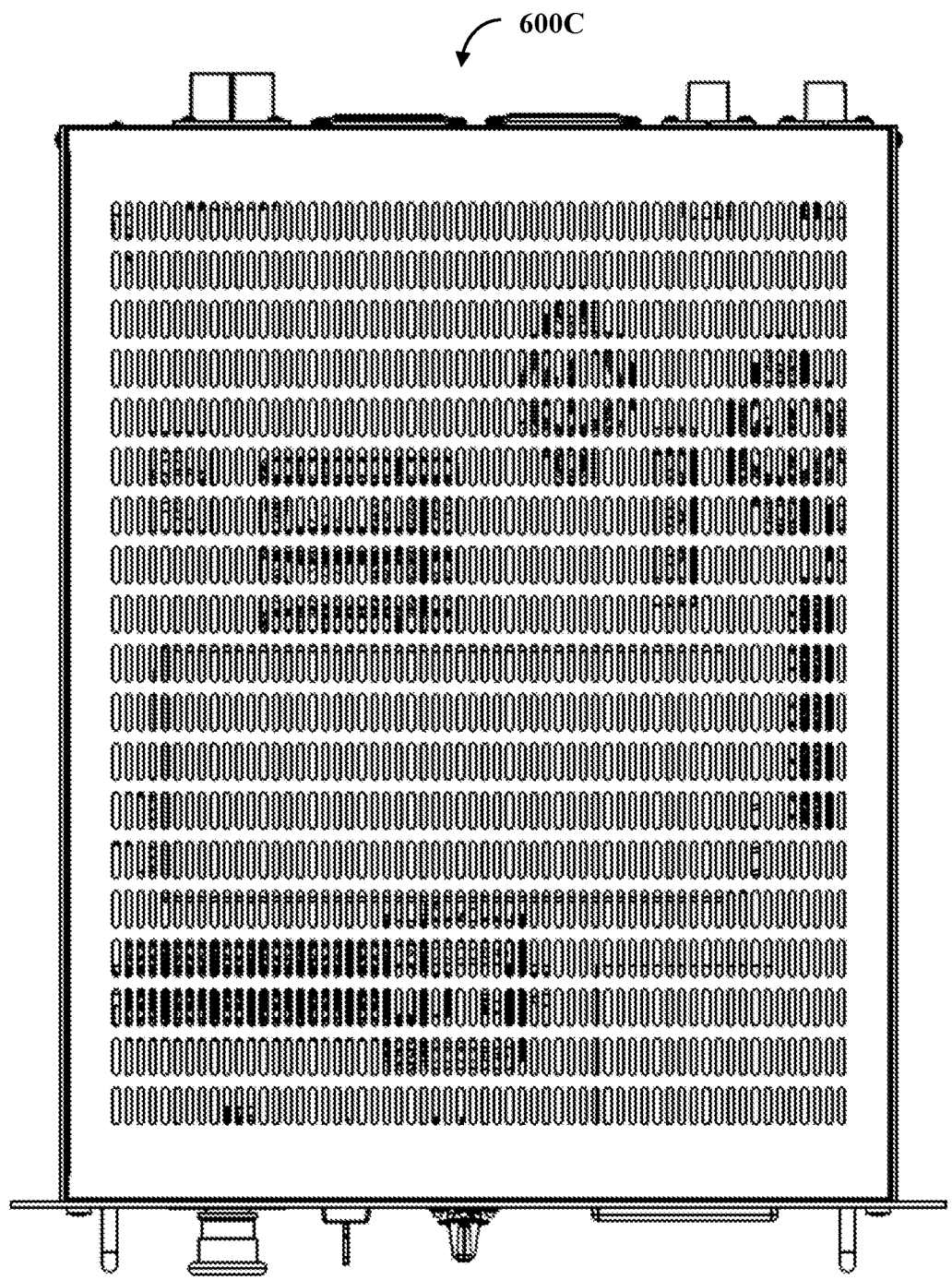
Figure 6D:
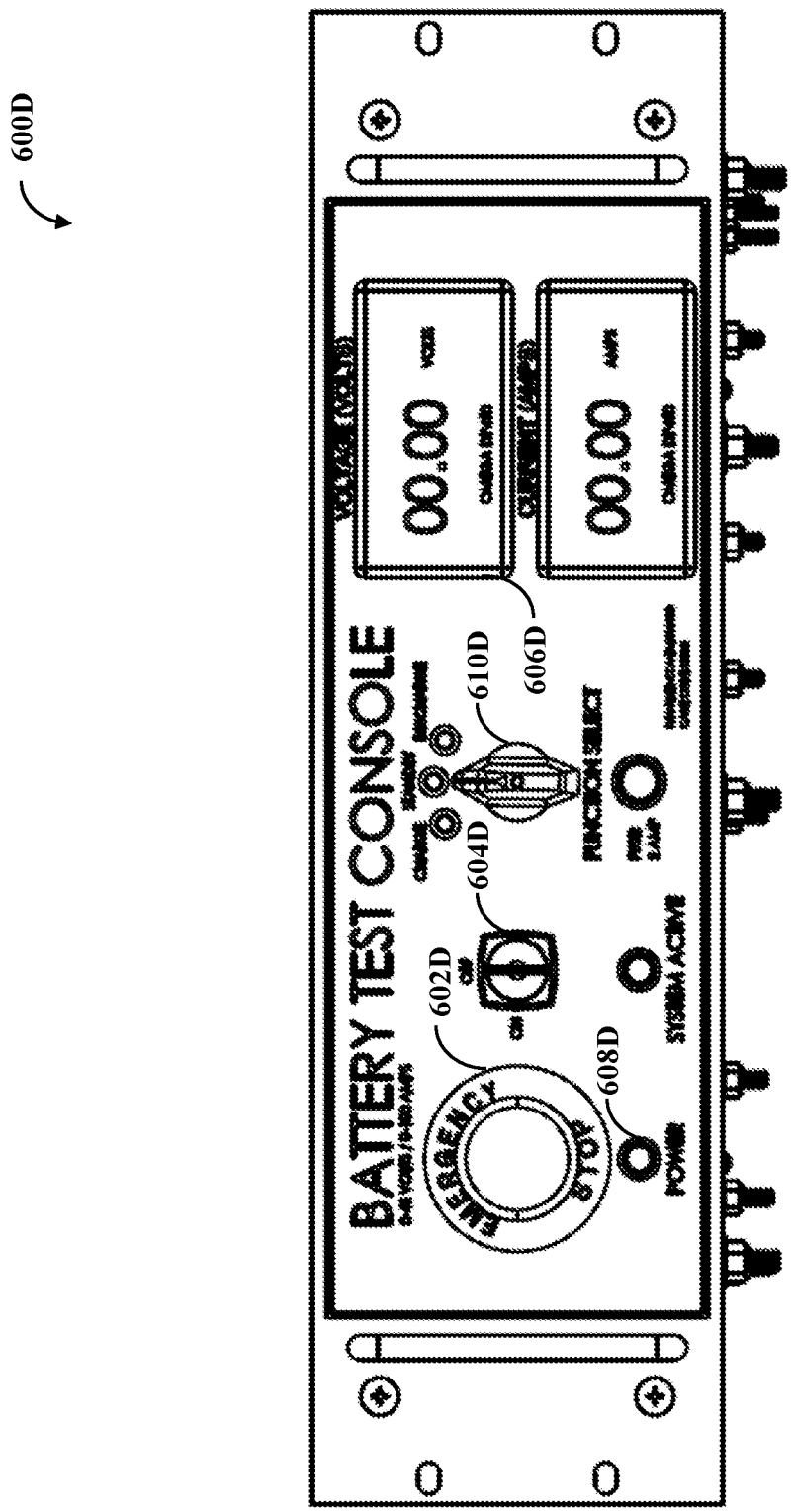
Figure 6E:
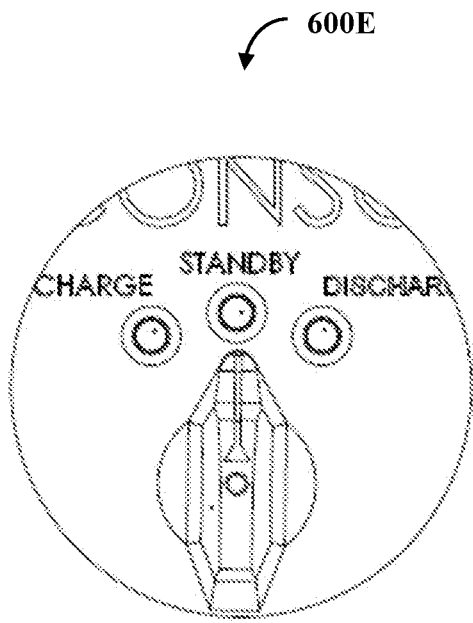
Figure 6F:
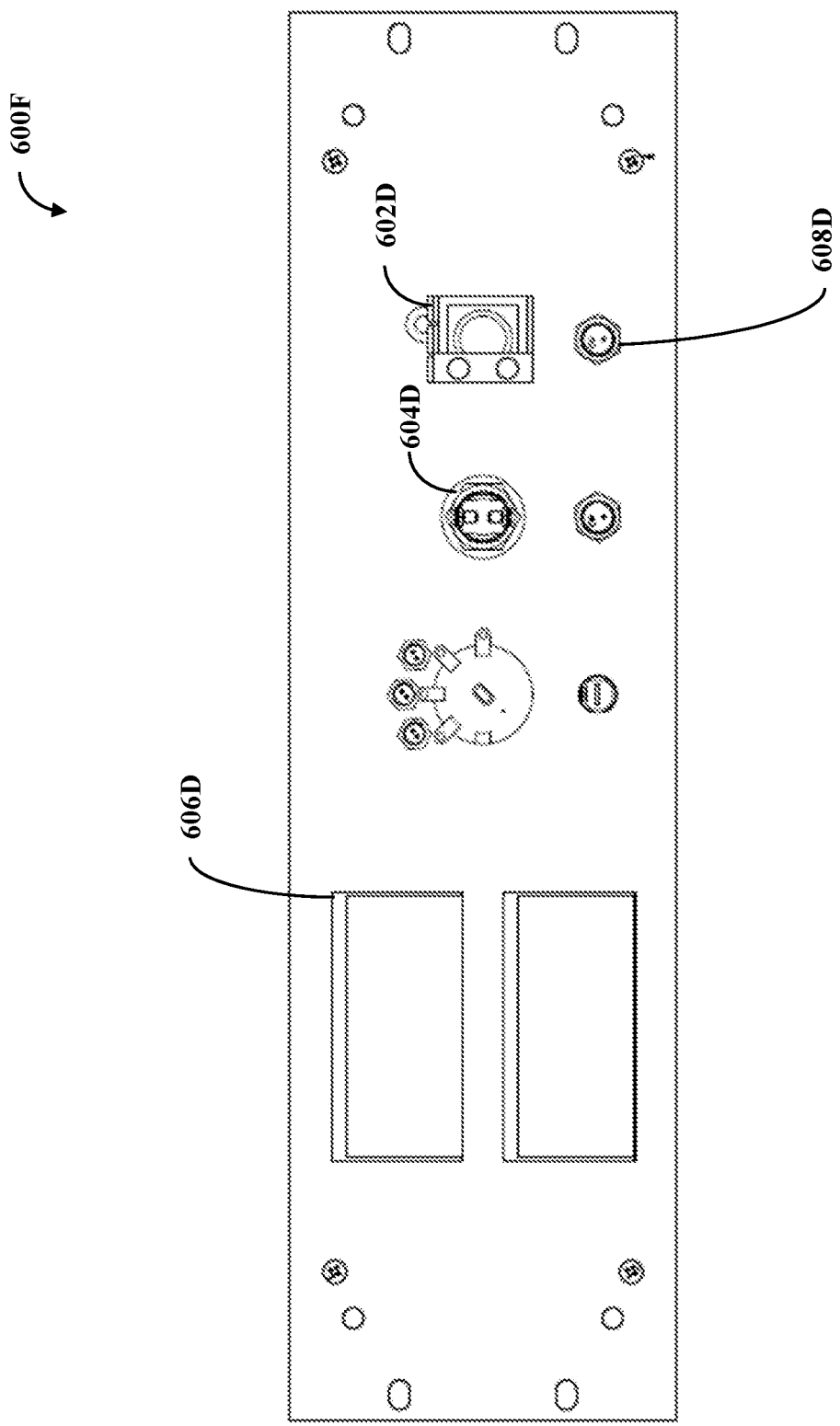

FIGS. 6A-6K illustrate one embodiment of various views of the apparatus that can be used to facilitate practicing at least one aspect disclosed herein. FIG. 6A illustrates a perspective view 600A, FIG. 6B illustrates a side view 600B, FIG. 6C illustrates a top view 600C, and FIG. 6D illustrates a front view 600D. The front view 600D illustrates a front panel an emergency stop 602D, a key switch 604D, a display set 606D, a light set 608D, and a selector switch 610D. FIG. 6E illustrates a zoomed in view 600E of the selector switch 610D. The selector switch 610D shows three settings—charge, standby, and discharge. The selector switch 610D can function as the administration component discussed above. FIG. 600F illustrates an interior view of the front panel inversed of the front view 600D.

Figure 6G:
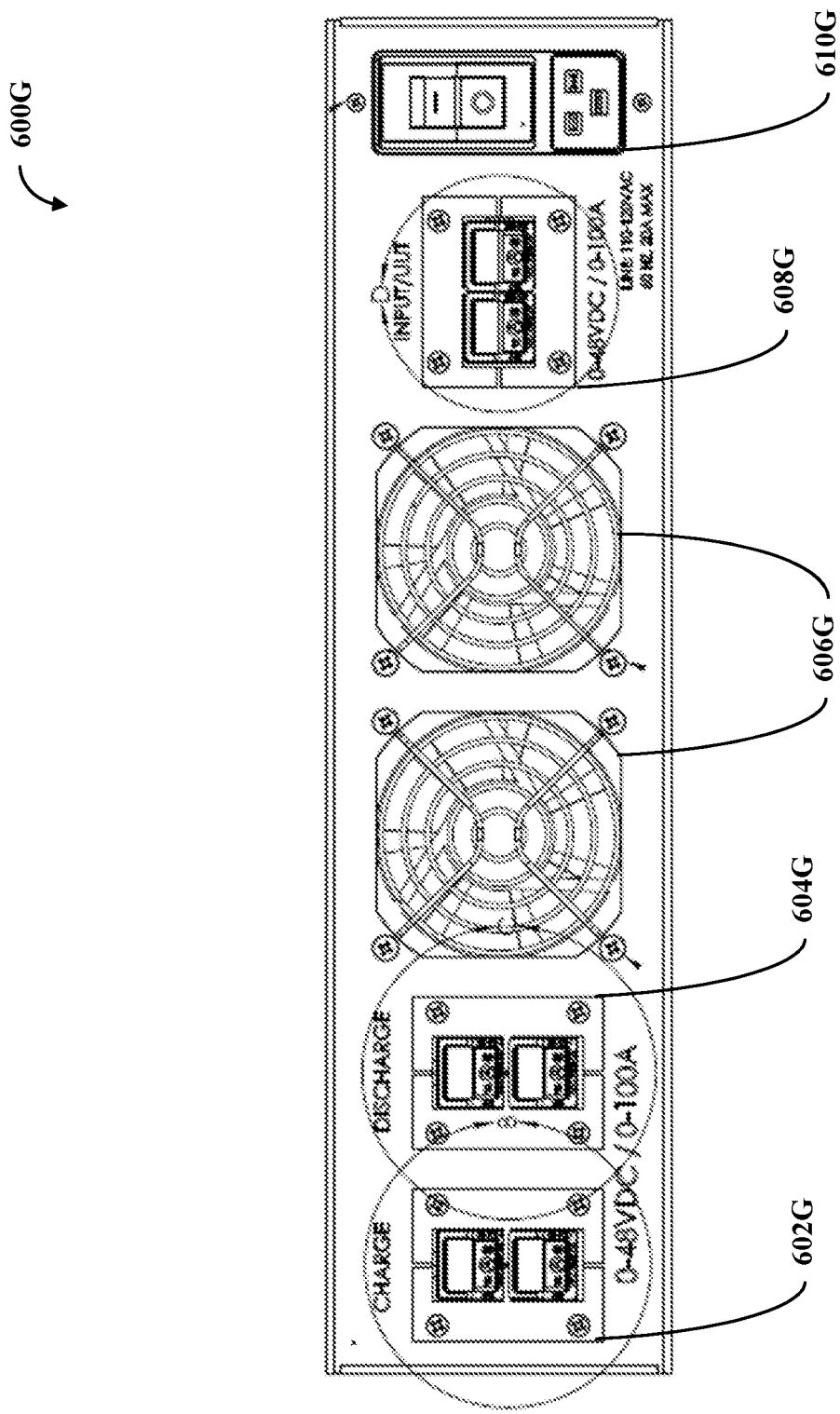
Figure 6H:
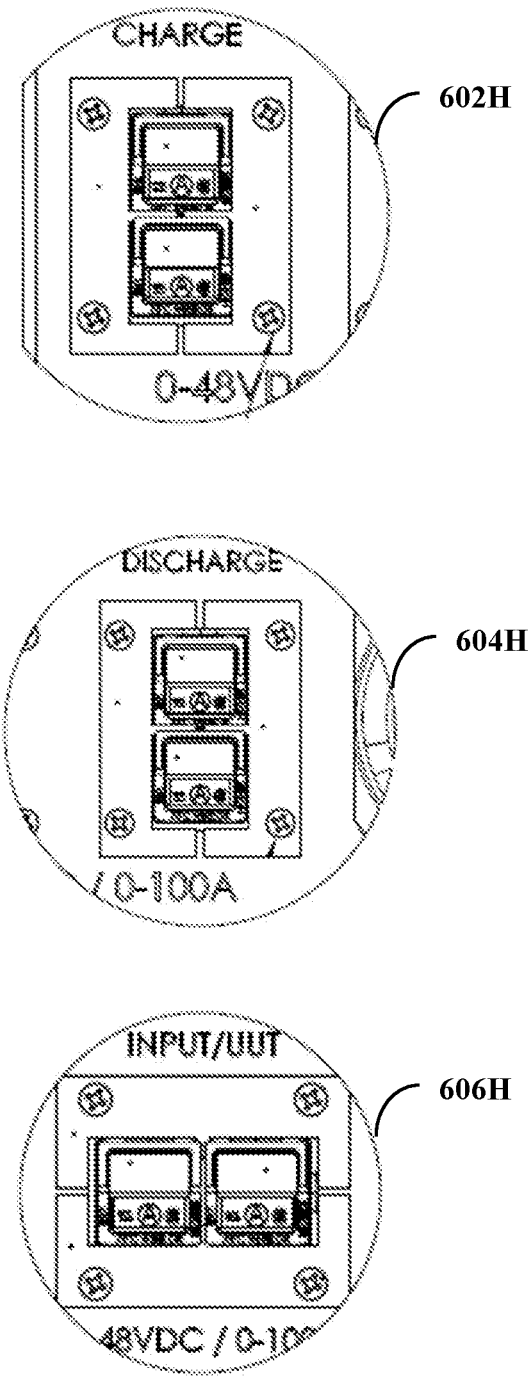
Figure 6I:
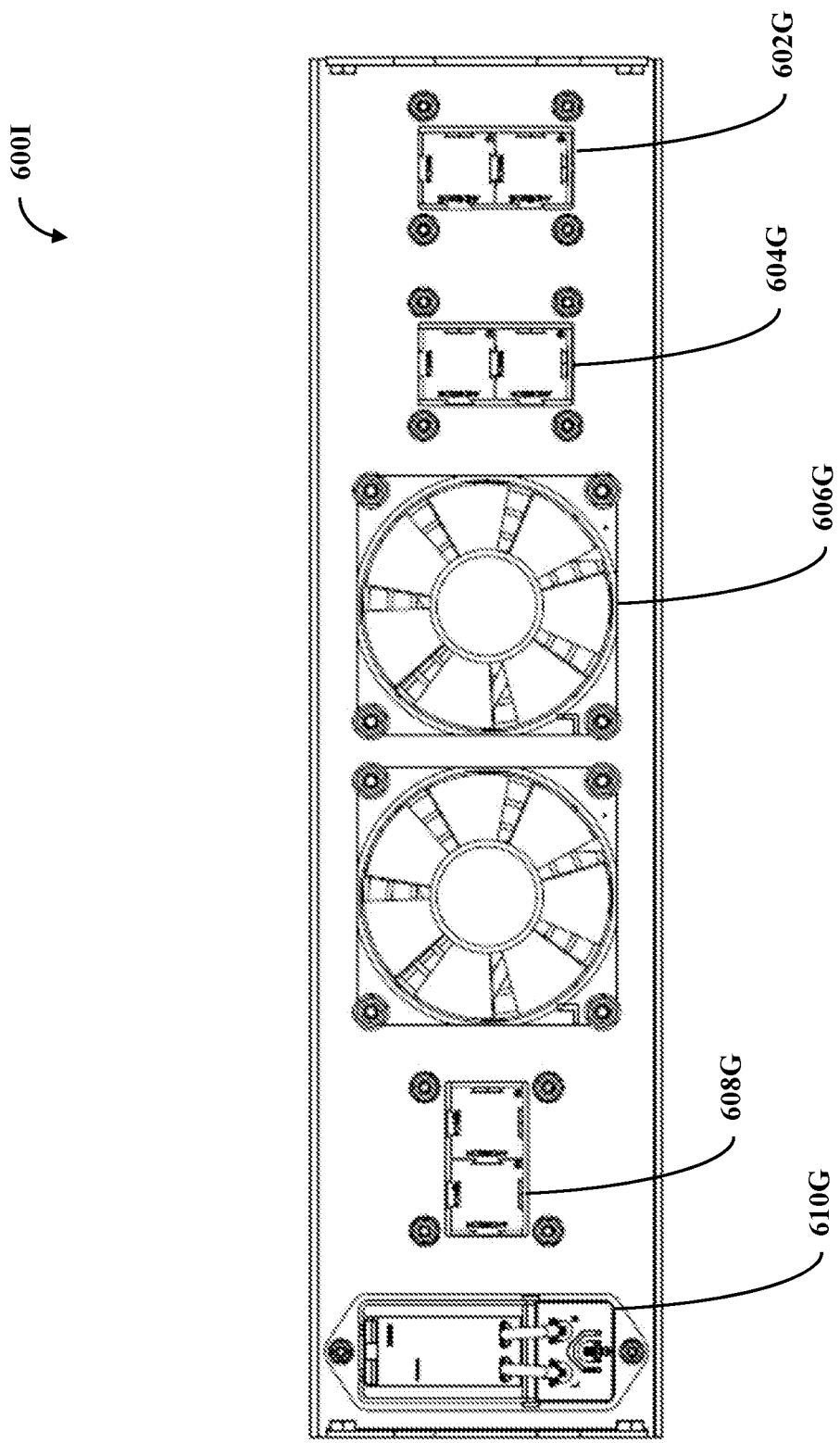

FIG. 6G illustrates a front view 600G of a back panel comprising a charge connector port 602G, a discharge connector port 604G, an exhaust fan set 606G, a battery connector port 608G, and an outlet connector port 610G. FIG. 6H illustrates a zoomed in view 602H of the charge connector port 602G, a zoomed in view 602H of the discharge connector port 604G, and a zoomed in view 606H of the battery connector port 608G. In one example, the ports 602G and 604G are the conduit component while the port 608G is the exchange component. In another example, the port 602G is the charge component 130 of FIG. 2, the port 604G is the discharge component 140 of FIG. 2, and the port 608G is the interface component 210 of FIG. 2. In yet another example, the port 602G can be considered charge hardware while the port 604G can be considered discharge hardware. FIG. 6I illustrates an interior view 600I of the back panel inversed of the front view 600G.

Figure 6J:
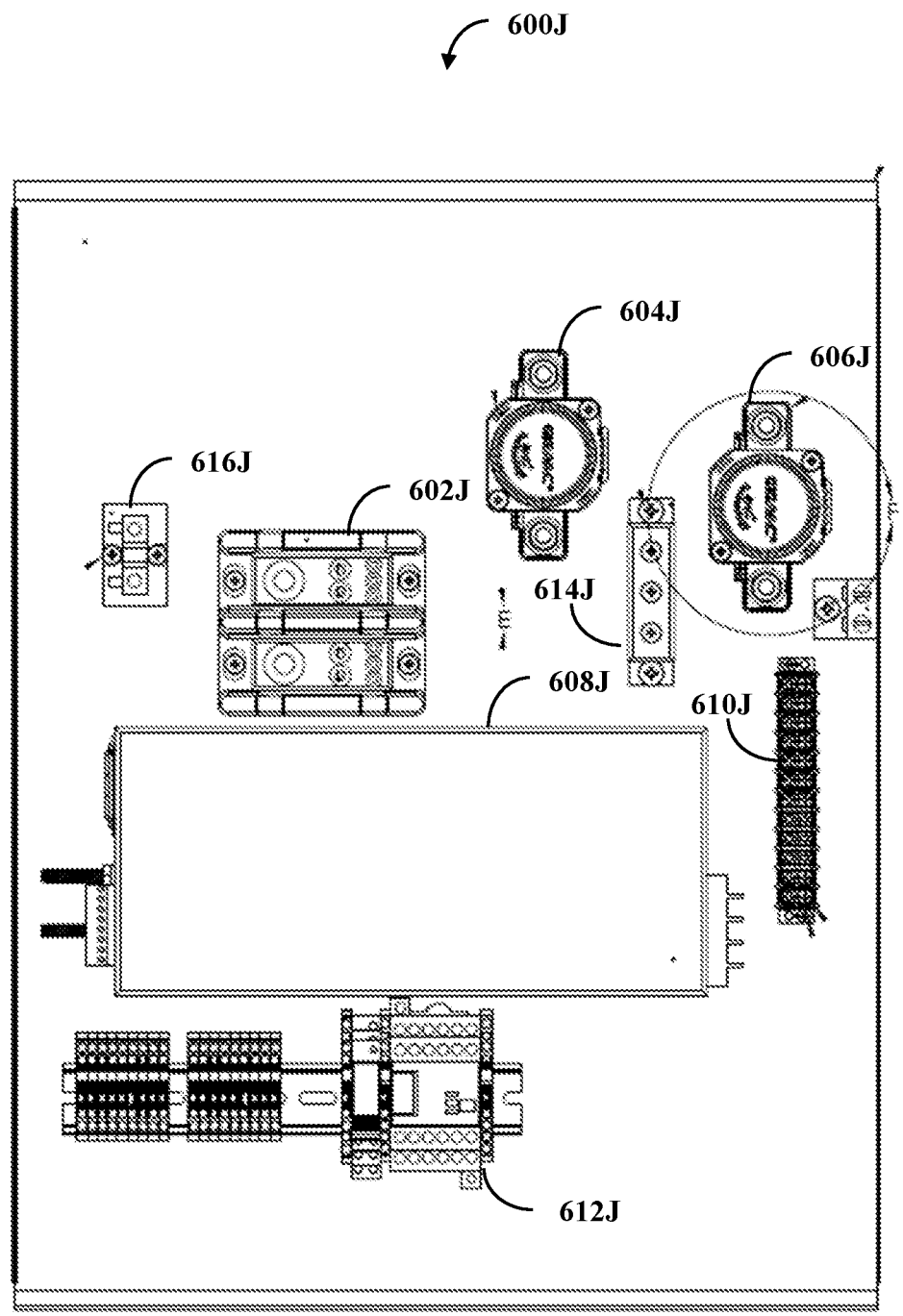
Figure 6K:
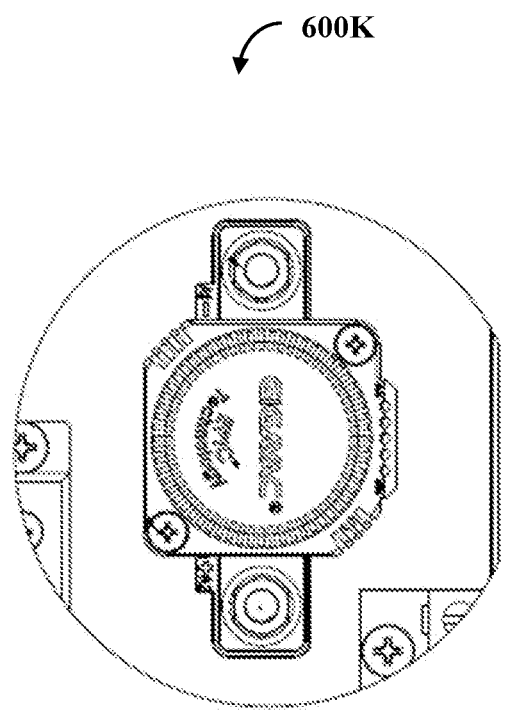

FIG. 6J illustrates a top view 600J of the apparatus with a top panel removed. The top view 600J illustrates different hardware that can be used to practice aspects disclosed herein. The hardware includes power distribution block 602J (e.g., 600 V and 420 A), two contactors 604J and 606J (e.g., 0-48 VDC, 150 A, 24 VDC coil voltage), a power supply 608J (e.g., 24 VDC, 25 A, 600 Watts (W)), a terminal strip 610J (e.g., 12 position, 300 VAC/VDC), a relay block 612J, a TVS diode Schottky rectifier 614J (e.g., 200 A), and a shunt 616J (100 A). FIG. 6K illustrates a zoomed in view of the contactor 606J.

FIG. 7 illustrates one embodiment of a system 700 comprising a processor 710 (e.g., a general purpose processor or a processor specifically designed for performing a functionality disclosed herein) and a computer-readable medium 720 (e.g., non-transitory computer-readable medium). In one embodiment, the computer-readable medium 720 is communicatively coupled to the processor 710 and stores a command set executable by the processor 710 to facilitate operation of at least one component disclosed herein (e.g., the administration component). In one embodiment, at least one component disclosed herein (e.g., the management component) can be implemented, at least in part, by way of non-software, such as implemented as hardware by way of the system 700. In one embodiment, the computer-readable medium 720 is configured to store processor-executable instructions that when executed by the processor 710, cause the processor 710 to perform a method disclosed herein (e.g., the methods 800-1000 addressed below).

FIG. 8 illustrates one embodiment of a method 800 comprising two actions 810-820. At 810, causing a charging of the battery 110 of FIG. 2 can occur, such as by way of the power supply. This charging can be caused by controlling (e.g., opening and closing) a relay set such that the charge component 130 of FIG. 2 charges the battery 110 of FIG. 2. The charging can occur along a hardware connection (e.g., a physical wire between the apparatus and the battery 110 of FIG. 2).

At 820, causing a discharging of the battery 110 of FIG. 2 can occur, such as by way of the electrical load. This discharging can be caused by controlling the relay set such that the charge component 130 of FIG. 2 charges the battery 110 of FIG. 2. The discharging can occur along the hardware connection with the hardware connection remaining connected to the battery 110 of FIG. 2 between the charging and the discharging.

FIG. 9 illustrates one embodiment of a method 900 comprising five actions 910-950. At 910, a check can occur to determine if charging or discharging should occur (e.g., from a standby position). If discharge should occur, then, at 920, charging hardware can be disabled (e.g., by way of keeping a relay open) and, at 930, discharging hardware can be enabled (e.g., by way of closing a relay). Conversely, if charge should occur, then, at 940, discharging hardware can be disabled and, at 950, charging hardware can be enabled. As part of this charging and discharging, the charging hardware and discharging hardware can be isolated from one another by way of the TVS diode.

The method 900 can be employed in managing between the charging and the discharging such that the charging and the discharging do not occur simultaneously. The management can be accomplished, at least in part, by controlling opening and closing of a charge relay and a discharge relay such that the charge relay and the discharge relay are not closed at the same time.

FIG. 10 illustrates one embodiment of a method 1000 comprising four actions 1010-1040. At 1010, charging and discharging can occur, such as in accordance with the method 800 of FIG. 8 and/or in accordance with the method 900 of FIG. 9. At 1020, monitoring the charging can occur to produce a monitor result. A check, at 1030, determines if a safety fail condition takes place based, at least in part, on the monitoring result. If there is no safety fail condition, then the method 1000 can continue to monitor. If there is a safety fail condition (e.g., the monitor result indicates that a safety fail condition is met), then, at 1040, then interrupting a power occurs such that charging and discharging of the battery 110 of FIG. 2 does not occur. In one example, the method 1000 is practiced by the emergency stop switch S5 of FIG. 5.

In one example, a monitoring apparatus can be employed to practice the method 1000. The monitoring apparatus can have a threshold value and if that threshold value is reached (e.g., met or surpassed), then a trigger event can occur such as cutting power. Example trigger events can be a voltage being met or a current being surpassed.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A system, comprising:
an interface component, that is at least partially hardware, configured to interface with a battery with a single input/output terminal; and
a charge component configured to charge the battery while the interface component is interfaced with the battery; and
a discharge component configured to discharge the battery while the interface component is interfaced with the battery; and
an isolation component configured to isolate the charge component from the discharge component,
where the charge component and then subsequently the discharge component are configured to operate while the interface component interfaces with the battery and
where the discharge component and then subsequently the charge component are configured to operate while the interface component interfaces with the battery,
where the isolation component is not part of the charge component, and
where the isolation component is not part of the discharge component.

2. A system, comprising:
an interface component, that is at least partially hardware, configured to interface with a battery with a single input/output terminal; and
a charge component configured to charge the battery while the interface component is interfaced with the battery;
a discharge component configured to discharge the battery while the interface component is interfaced with the battery; and
a management component configured to manage between the charge component and the discharge component such that the battery is not charged and discharged concurrently,
an isolation component configured to isolate the charge component from the discharge component,
where the charge component and then subsequently the discharge component are configured to operate while the interface component interfaces with the battery and
where the discharge component and then subsequently the charge component are configured to operate while the interface component interfaces with the battery,
where the management component is implemented, at least in part, by way of a dial,
where the dial comprises a discharge setting that causes the discharge component to discharge the battery,
where the dial comprises a charge setting that causes the charge component to charge the battery,
where the dial comprises a neutral setting that does not cause charge or discharge,
where the discharge setting causes the discharge component to discharge the battery and prevent causation of the battery to charge, and
where the charge setting causes the charge component to charge the battery and prevent causation of the battery to discharge.

3. The system of claim 2,
where the battery is a large format battery.

4. The system of claim 1, where the battery is a large format battery.

5. The system of claim 1, where the battery is of at least about 20 Volts direct current.

6. The system of claim 2,
where the isolation component is not part of the charge component
where the isolation component is not part of the discharge component.

7. The system of claim 1,
where the isolation component isolates the charge component from the discharge component, at least in part, by way of a Schottky diode.

8. The system of claim 1, comprising:
a management component configured to manage between the charge component and the discharge component such that the battery is not charged and discharged concurrently.

9. The system of claim 8,
where the management component is implemented, at least in part, by way of a switch comprising:
a discharge setting that causes the discharge component to discharge the battery;
a charge setting that causes the charge component to charge the battery; and
a neutral setting that does not cause charge or discharge.

10. The system of claim 9, comprising:
a charge relay configured to be closed when the switch is at the discharge setting, configured to be closed when the switch is at the neutral setting, and configured to be open when the switch is at the charge setting; and
a discharge relay configured to be open when the switch is at the discharge setting, configured to be closed when the switch is at the neutral setting, and configured to be closed when the switch is at the charge setting.

11. The system of claim 1,
where the interface component is configured to, in achievement of the interface with the battery, physically couple to a singular conduit that physically couples to the single input/output terminal of the battery,
where the charge component charges the battery by way of the singular conduit, and
where the discharge component discharges the battery by way of the singular conduit.

12. The system of claim 2,
where the battery is of at least about 20 Volts direct current.

13. The system of claim 2, comprising:
a check component configured to identify an existence of a safety fail condition; and
a discharge safety component configured to cause the discharge component to stop the discharge of the battery when occurring in response to identification of the safety fail condition; and
a charge safety component configured to cause the charge component to stop the charge of the battery when occurring in response to identification of the safety fail condition.

14. The system of claim 2,
where a charge relay is configured to be closed when the dial is at the discharge setting, configured to be closed when the dial is at the neutral setting, and configured to be open when the dial is at the charge setting; and
where a discharge relay is configured to be open when the dial is at the discharge setting, configured to be closed when the dial is at the neutral setting, and configured to be closed when the dial is at the charge setting.

15. The system of claim 2,
where the isolation component isolates the charge component from the discharge component, at least in part, by way of a transient-voltage-suppression diode.

16. The system of claim 2,
where the interface component is configured to, in achievement of the interface with the battery, physically couple to a conduit that physically couples to the battery,
where the charge component charges the battery by way of the conduit and
where the discharge component discharges the battery by way of the conduit.

17. The system of claim 1, comprising:
a check component configured to identify an existence of a safety fail condition; and
a safety component configured to cause the charge component to stop the charge of the battery and configured to stop the discharge component from to stop the discharge of the battery in response to the identification of the existence of the safety fail condition.

18. The system of claim 17,
where the identification of the safety fail condition is identification that a user presses an emergency button.

19. The system of claim 17,
where identification of the safety fail condition is identification of a current level meeting a threshold level.

20. The system of claim 17,
where the identification of the safety fail condition is identification of a voltage level meeting a threshold.

* * * * *